United States Patent

Walker

[19]

[11] Patent Number: 5,875,518
[45] Date of Patent: Mar. 2, 1999

[54] CASTOR

[75] Inventor: Phillip Stuart Walker, Wexham, England

[73] Assignee: Flexello Limited, Slough, England

[21] Appl. No.: 860,369
[22] PCT Filed: Dec. 7, 1995
[86] PCT No.: PCT/GB95/02867
§ 371 Date: Jun. 6, 1997
§ 102(e) Date: Jun. 6, 1997
[87] PCT Pub. No.: WO96/17733
PCT Pub. Date: Jun. 13, 1996

[30] Foreign Application Priority Data

Dec. 7, 1994 [GB] United Kingdom ................... 9424761

[51] Int. Cl.⁶ ................................................. B60B 33/00
[52] U.S. Cl. ................................. 16/46; 16/47; 16/35 R
[58] Field of Search ................................ 16/18 R, 46, 47, 16/35 R

[56] References Cited

U.S. PATENT DOCUMENTS

| 2,895,160 | 7/1959 | Clifton | 16/47 |
| 3,894,310 | 7/1975 | Screen | 16/47 |
| 5,787,547 | 8/1998 | Joseph et al. | 16/35 R |

FOREIGN PATENT DOCUMENTS

| 2741122 | 3/1978 | Germany | 16/35 R |
| 2937572 | 4/1981 | Germany | 16/47 |
| 1506584 | 4/1978 | United Kingdom | 16/35 R |
| 2147377 | 5/1985 | United Kingdom | 16/35 R |

*Primary Examiner*—Chuck Y. Mah
*Assistant Examiner*—Donald M. Gurley
*Attorney, Agent, or Firm*—Woodard, Emhardt, Naughton Moriarty & McNett

[57] ABSTRACT

A castor comprises a fork (10) carrying an axle (11) which extends through an aperture in both limbs (12 and 13) and by which a single wheel comprising two discs (14 and 15) is mounted on the fork (10). A roller bearing (22) is mounted on the axle (11). Each disc, (14, 15) comprises a radially outwardly extending annular disc portion (23, 24) and a tubular portion (25, 26) which projects to one side of the respective disc portion (23, 24). The tubular portions (25 and 26) are snap-fitted together, one within the other, and together form the single wheel which has two rims (27 and 28). The roller bearing (22) is fitted into the bore of the tubular portion (26) whereby the single wheel is supported thereon for rotation. The tubular portion (26) provides a plain bearing support for the tubular portion (25) of the other disc (14). Relative angular movement between the discs (14 and 15) is possible because of that. The interengaged tubular portions (25 and 26) extend through the central aperture of a ring (35) which is supported between the discs (14 and 15) by the fork (10), being connected to a bridgepiece (30) thereof by a snap-fitting engagement. The central aperture of the ring (35) is oval. There is a clearance between it and the tubular portion (25) above and below but not at the sides. A brake pad (39) is fitted to the bottom of the ring (35) to rest on the surface of a moving walkway when the rims (27 and 28) of the discs (14 and 15) of the single wheel are received in the grooves (41) on the surface of the moving walkway.

20 Claims, 3 Drawing Sheets

CASTOR

This invention relates to castors, in particular, to castors which may be used on a moving walkway.

Moving walkways are becoming common in places such as airports and shops. When such a walkway is roughly horizontal it is easy to handle loads supported on castors, for example a shopping trolley. However, when such a walkway is on a slope, loads supported on castors can be difficult to manage. To overcome this problem the wheels of specially designed castors are designed to slot into grooves which are provided in the surface of the walkway so that they do not have a surface to rotate against, thereby preventing movement of the load due to rotation of the wheels. GB-A-2085103 discloses such a shopping trolley castor. It comprises a fork having two limbs depending from a bridgepiece, two relatively rotatable discs journalled on an axle which is mounted on and which extends between the limbs, each disc having an annular disc portion and a central aperture. The bearings for the discs are spaced axially from one another on the axle and are separated by a larger diameter cylindrical part of the axle which is surrounded by a loose fitting brake ring which will hang on that cylindrical part without touching the ground when the castor is running on a flat floor whereas it is pressed into frictional engagement with the walkway by the cylindrical part when the rims of the discs drop into grooves of that walkway.

The grooved surface need not be formed by a moving walkway. A static length of a similar surface is often provided in the region of an exit from a supermarket in order to trap the wheels of a shopping trolley so as to inhibit shopping trolleys being taken out of the supermarket by customers. This is known as a trolley trap.

Known types of castor designed specifically for use on moving walkways or to be trapped by a trolley trap are time consuming to assemble and expensive to manufacture. Examples of castors of this type are disclosed by DE-B-2656322, DE-A-2937572, DE-A-3128720. In each of these, as in the castor disclosed by GB-A-2085103, the two wheels are journalled on respective bearings which are side by side, spaced one from the other along the axis of rotation of those wheels.

GB-A-1416992, U.S. Pat. No. 3,822,437 and U.S. Pat. No. 3,894,310 each show a twin wheel castor which has a body by which it is attached to structure it is to support for pivoting relative thereto about a vertical axis. In each case, the two wheels are rotatably mounted on a portion of the body of the castor which is disposed between them. The wheels include integral hollow spigots which fit one within the other. These spigots are, in turn, received in a further spigot which is formed integrally within the portion of the body between the wheels, these castors are designed for light-weight duties such as at the feet of television cabinets or other such furniture which normally is stationary. They are not sufficiently structurally robust for heavy duty applications such as for shopping trolleys.

An object of the present invention is to provide a castor for use on a moving walkway or to be trapped by a trolley trap which is simple and cheap to manufacture.

According to the invention there is provided a castor comprising a fork having two limbs depending from a bridgepiece and two relatively rotatable discs journalled on an axle which is mounted on and which extends between the limbs, each disc having an annular disc portion and a central aperture, wherein the two discs together from a single wheel and the central aperture of each disc is formed by a respective axially projecting tubular portion, one of the tubular portions extending over a major part of the spacing between the limbs and being supported along its axial length by a bearing for rotation of the single wheel on the axle, the other tubular portion being supported along a substantial part of its length by said one tubular portion which provides a plain bearing support for said other tubular portion and which allows rotation on the axle of one of the discs relative to the other.

Preferably, the tubular portions are snap-fitted together, with one such portion having a male snap means and the other portion having female snap means which are interengaged with the male snap means.

There may be a ring depending from the bridgepiece between the discs with a brake pad at its bottom, the tubular portions extending through a central aperture of the ring.

The axle may be a nut and a bolt.

The bearing for rotation of the respective disc on the axle may be a roller bearing.

Preferably, there is a coned ring at the end of each tubular portion adjacent the annular disc portion, sized and positioned so that when said roller bearing is positioned inside the tubular portions it is encapsulated therein, but the axle can pass through its central aperture.

The coned ring may be arranged to act as a Belleville washer.

A castor which may be used on a moving walkway and in which the invention is embodied will now be described by way of example with reference to the accompanying drawings in which.

Figure 1:
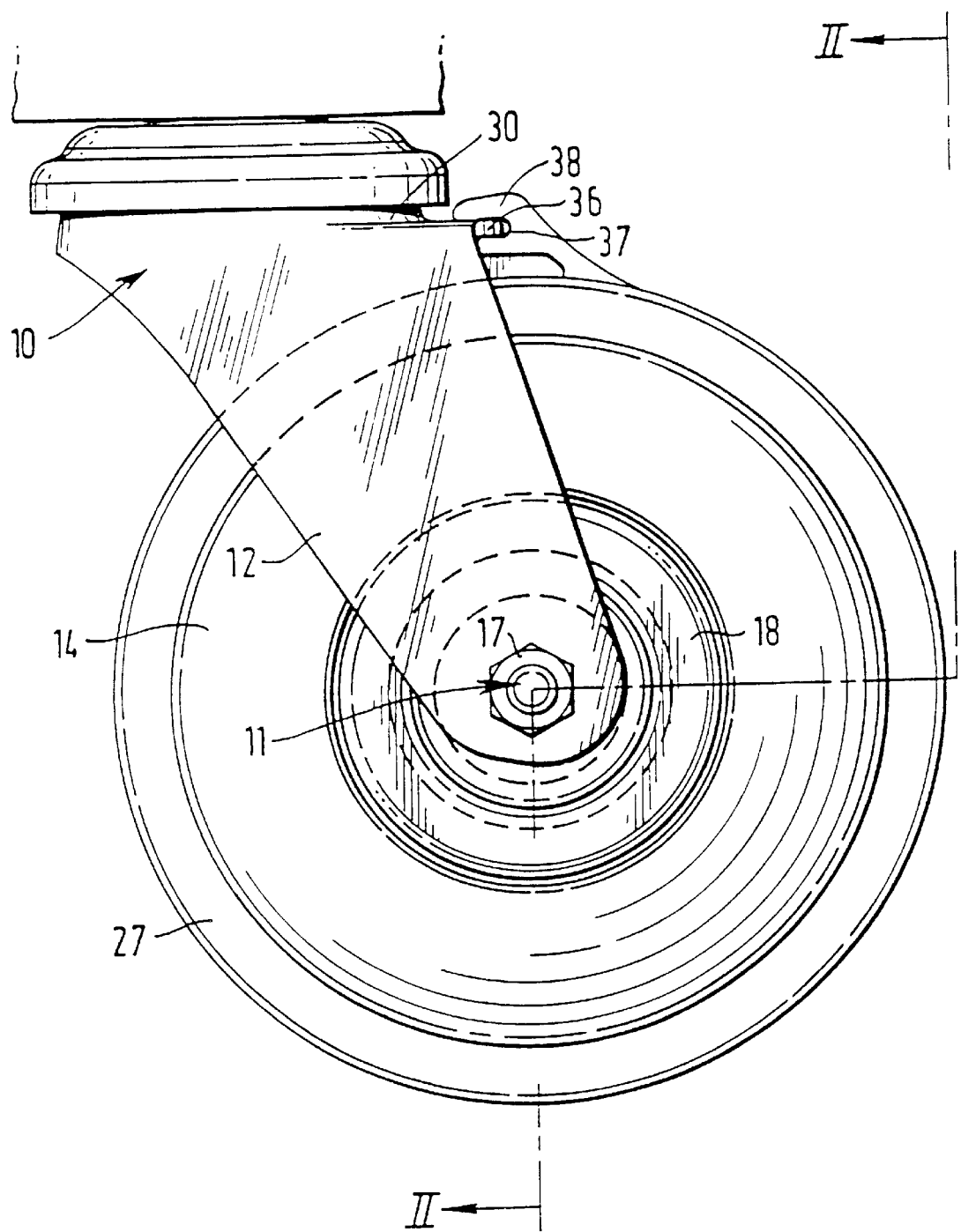
FIG. 1 is a side elevation of the castor.
Figure 2:
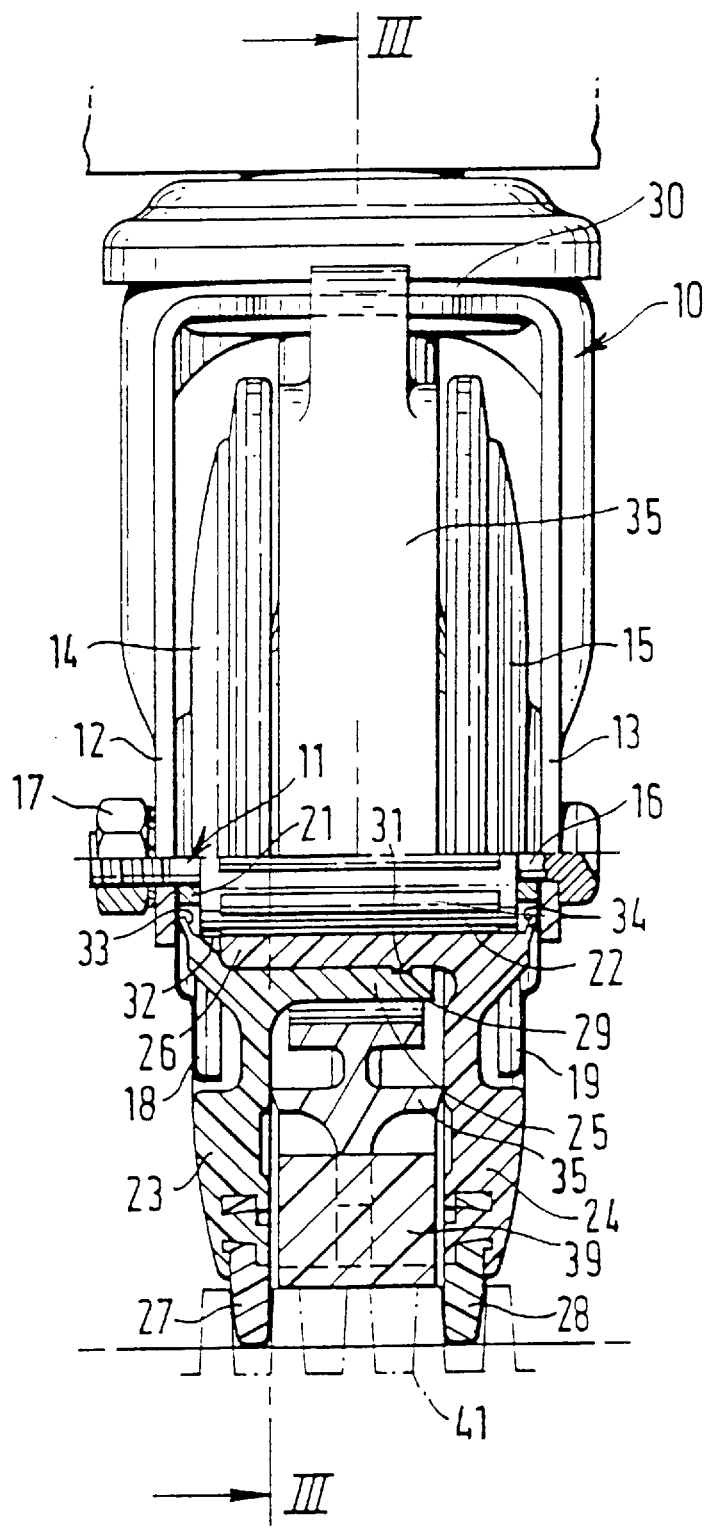
FIG. 2 is a partly sectioned elevation of the castor shown in FIG. 1, the section being on the line II—II in FIG. 1.

FIGS. 1 and 2 show a castor which comprises a fork 10 carrying an axle 11 which extends through an aperture in both limbs 12 and 13 of the fork 10 and by which two discs 14 and 15 are mounted on the fork 10. The axle 11 comprises a bolt 16 with a head at one end and a shank which is threaded at the other end. The head abuts an outer face of one, 13, of the limbs 12 and 13. A nut 17 is screwed onto the other end of the bolt 16 and abuts an outer face of the other limb 12. Hence, the head and the nut 17 limit outward deflection of the limbs 12 and 13. A pair of saucer-shaped annular thread guards 18 and 19 are mounted on the shank of the bolt 16 which extends through their central apertures. A tube 21 surrounds the shank and extends between the limbs 12 and 13. The nut 17 and bolt 16 are tightened up to clamp the limbs 12 and 13 against the end of the tube 21, the thread guards 18 and 19 being trapped between the respective limb 12, 13 and the tube 21. A roller bearing 22 is mounted on an outer surface of the tube 21.

FIG. 2 shows that each disc 14,15 comprises a radially outwardly extending annular disc portion 23,24 and a tubular portion 25,26 which projects to one side of the respective disc portion 23,24. The outer rim of each annular disc portion 23,24 is formed by a ring 27,28 of a wear resistant material which may be a suitable plastics material such as polyurethane. Each annular disc portion 23,24 and the respective ring 27,28 are formed by moulding so that they are mechanically interlocked. The tubular portion 25 has an annular groove 29 formed in its inner surface, the groove 29 serving as a female snap ring. The other tubular portion 26 has an annular protuberance 31 formed on its outer surface, the protuberance serving as a male snap ring. The tubular portions 25 and 26 are snap-fitted together when the castor is assembled, the two discs 14 and 15 together forming a single wheel with two rims as can be seen in FIG. 2. The tubular portion 26 is within the tubular portion 25 as can be seen from FIG. 2, and the annular protuberance 31 is engaged within the annular groove 29.

The tubular portion 25 of the disc 14 extends for more than half the width of the single wheel from one side thereof, its bore 32 being rebated for a major part of its length from the end that is remote from the annular disc portion 23, thereby forming an annular recess, the remaining minor portion being adjacent to the roller bearing 22. The tubular portion 26 of the other disc 15 extends over a major part of the width of the single wheel from the other side of the wheel and is spigotted into the annular recess formed by the rebated portion of the bore 32 of the tubular portion 25, the end of the tubular portion 26 of the other disc 15 being in abutment with the step at the inner end of the rebated portion of the bore 32.

Each disc 14,15 has a shallow coned ring 33,34 formed integrally around the central aperture of its annular disc portion 23,24 on the side thereof remote from its tubular portion 25,26. The smaller diameter peripheral edge of the coned ring 33,34 reacts against the adjacent limb 12,13 of the fork 10 through the respective threadguard 18,19.

The roller bearing 22 is fitted into the bore of the tubular portion 26 whereby the single wheel formed by the two discs 14 and 15 is supported thereon for rotation thereabout. The diameter of the smaller radially inner peripheral edge of each coned ring 33,34 is less than the outside diameter of the roller bearing 22 but is greater than that of the outside diameter of the tube 21. Hence the roller bearing 22 is retained within the single wheel by the coned rings 33 and 34. The axial length of the roller bearing 22 is less than the distance between the coned rings 33 and 34 so that the roller bearing 22 is free to float axially.

The tubular portion 26 of the disc 15 provides a plain bearing support for the tubular portion 25 of the other disc 14. Relative angular movement between the discs 14 and 15 is possible because of that and happens when the castor follows a curved track when it is supported on the two discs 14 and 15.

The two discs 14 and 15 are located axially against movement towards one another by their interengagement and are located against axial separation by the action of the nut 17 and bolt 16 through the limbs 12 and 13 and the thread guards 18 and 19 which each cooperates with the respective annular disc portions 23,24 formed at the adjacent end of the respective disc 14 15. The ring portions 33 and 34 may be arranged so as to tension the system to reduce, or prevent vibration of the discs 14 and 15 in an axial direction, without interfering significantly with rotation thereof.

Figure 3:
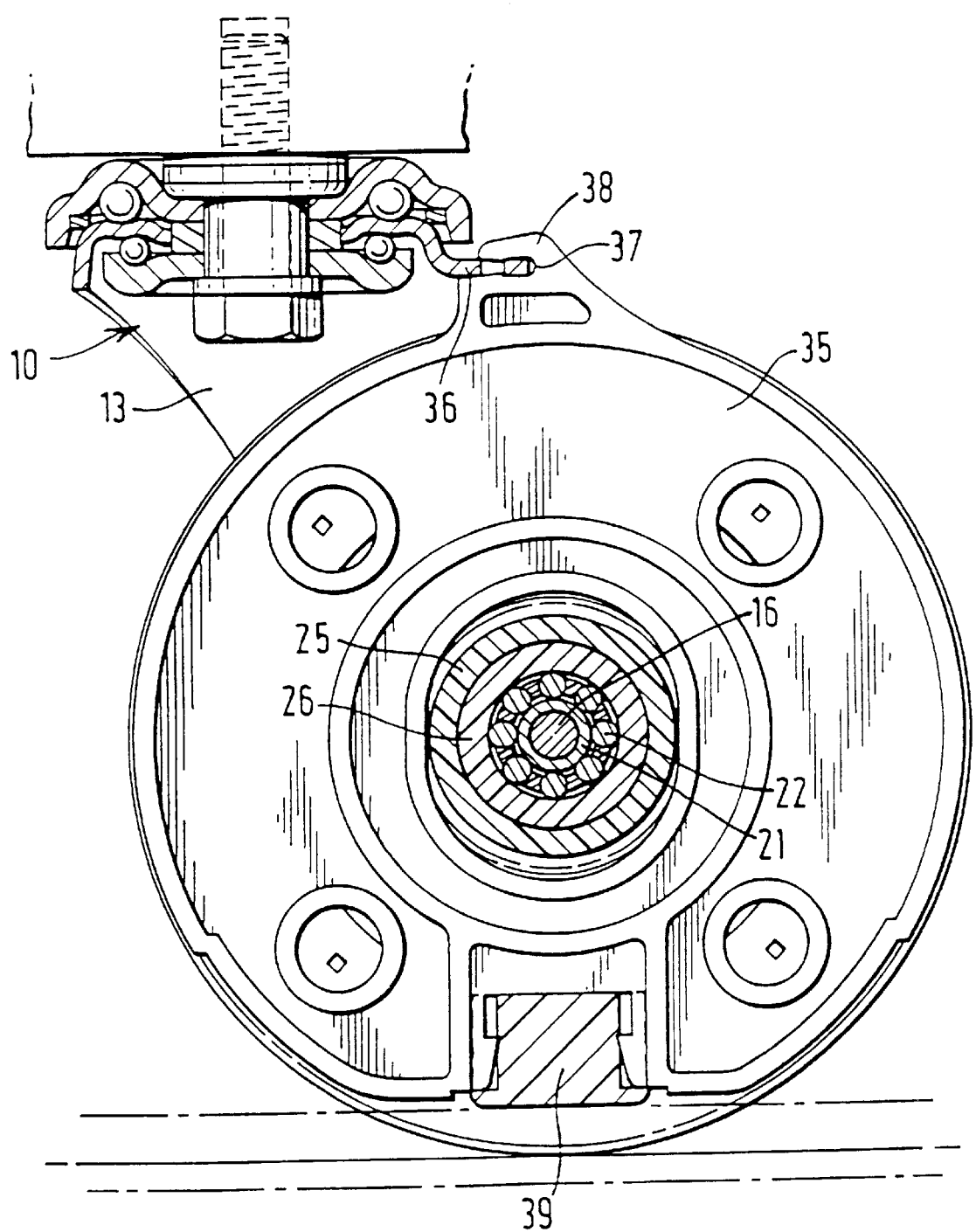
FIG. 3 is a section of the castor shown in FIGS. 1 and 2, the section being on the line III—III in FIG. 2.

The interengaged tubular portions 25 and 26 of the discs 14 and 15 extend through the central aperture of a ring 35 which is supported between the discs 14 and 14 by the fork 10. The ring 35 is connected to a crown or bridge piece 30 of the fork 10 by a snap-fit engagement of a peripheral edge 36 of the bridge piece 30 in a recess 37 which is formed in a radially projecting tongue 38 of the ring 35. FIG. 3 shows that the central aperture of the ring 35 is oval. There is a clearance between the tubular portion 25 and the edge of the central aperture above and below the tubular portion 25 whereas there is no substantial clearance between them at the sides of the tubular member 25. A pad 39 is fitted to the lowermost part of the ring 35 to rest on the surface of a moving walkway when the rims of the discs 14 and 15 of the single wheel are received in the grooves 41 on the surface of the moving walkway as indicated in chain dotted lines in FIG. 2.

To assemble the castor, the roller bearing 22 is placed inside the tubular portion 26 and the other tubular portion 25 is snap-fitted onto the inner tubular portion 26 through the central aperture of the ring 35. The roller bearing 22 is effectively encased in the tubular portions 25 and 26, by the coned rings 33 and 34. A sub-assembly comprising the discs 14 and 15, the ring 35 and the roller bearing 22 is formed, the two discs 14 and 15 being held together against relative movement in the direction of their axis by the interengaged snap rings. The tube 21 is then inserted inside the roller bearing 22. The threadguards 18 and 19 are then positioned adjacent the annular disc portions 23 and 24, and the sub-assembly and the threadguards 18 and 19 are placed between the limbs 12 and 13 of the fork 10. The nut 17 and bolt 16 are then positioned and secured so that the sub-assembly and the threadguards 18 and 19 are held in place between the limbs 12 and 13 of the fork 10. The ring 35 is snap-fitted onto the bridgepiece 30 of the fork 10.

When the castor is in use on a moving walkway, the rims 27 and 28 of the discs 14 and 15 of the single wheel drop into the grooves 41 of the moving walkway as shown in FIG. 2, the pad 39 then contacts the surface of the moving walkway between the grooves thereby providing a braking action. As a result the castor is locked against movement over the surface of the moving walkway by the combination of the snap fitting of the ring 35 at its top, the interengagement of the tubular portion 25 with the perimeter of the oval central aperture of the ring 35 at its side and the braking engagement of the pad 39 on the moving walkway as shown in FIGS. 2 and 3.

The arrangement is such that the load supported by the castor is supported by the discs 14 and 15 through the fork 10 and the axle 11 when the discs 14 and 15 are being rolled on a surface, whereas it is supported by the pad 39 through the fork 10 and the ring 35 when the pad 39 rests on the surface of the moving walkway.

It is claimed:

1. A castor comprising a fork having two limbs depending from a bridgepiece and two relatively rotatable discs journalled on an axle which is mounted on and which extends between the limbs, each disc having an annular disc portion and a central aperture, wherein the two discs together form a single wheel and the central aperture of each disc is formed by a respective axially projecting tubular portion, one of the tubular portions extending over a major part of the spacing between the limbs and being supported along its axial length by a bearing for rotation of the single wheel on the axle, the other tubular portion being supported along a substantial part of its length by said one tubular portion which provides a plain bearing support for said other tubular portion and which allows rotation on the axle of one of the discs relative to the other.

2. A castor according to claim 1, including a ring depending from the bridgepiece between the discs with a brake pad at its bottom, the tubular portions extending through a central aperture of the ring.

3. A castor according to claim 2, wherein there is no substantial clearance between said other tubular portion and the ring at the sides of said other tubular portion that extends through the central aperture of the ring whereas there is a clearance above and below said other tubular portion between it and the ring, the arrangement being such that the inter-engagement of said other tubular portion with the perimeter of the central aperture of the ring helps to lock the castor against movement over the surface of a moving walkway on which the castor is used when the brake pad is engaged with that walkway.

4. A castor according to claim 3, wherein the ring is snap-fit connected to the bridgepiece.

5. A castor according to claim 2, wherein the tubular portions are snap-fitted together, there being inter-engaging snap-fit formations formed respectively on each of a pair of cooperating surfaces of said tubular portions by which the plain bearing support for said other tubular portion is provided by said one tubular portion.

6. A castor according to claim 5, wherein there is no substantial clearance between said other tubular portion and the ring at the sides of said other tubular portion that extends through the central aperture of the ring whereas there is a clearance above and below said other tubular portion between it and the ring, the arrangement being such that the inter-engagement of said other tubular portion with the perimeter of the central aperture of the ring helps to lock the castor against movement over the surface of a moving walkway on which the castor is used when the brake pad is engaged with that walkway.

7. A castor according to claim 2, wherein the bearing which supports said one tubular portion for rotation on the axle comprises a roller bearing.

8. A castor according to claim 7, wherein-the roller bearing is free to float axially between the limbs.

9. A castor according to claim 7, wherein the roller bearing is encased between radially inward projections formed respectively at the remote ends of the central aperture of each of the tubular portions.

10. A castor according to claim 2, wherein the axle comprises a nut and a bolt, and a tube surrounds a shank of the bolt and extends between the limbs, the nut and bolt being tightened up to clamp the limbs against the ends of the tube and the nut and bolt limiting outward deflection of the limbs.

11. A castor according to claim 10, wherein the bearing which supports said one tubular portion for rotation on the axle comprises a roller bearing which is fitted on the outer surface of the tube.

12. A castor according to claim 2, wherein each rotatable disc is formed by moulding and the outer rim of each annular disc portion is formed of a wear resistant material which is mechanically interlocked with the remainder of the annular disc portion.

13. A castor according to claim 2, wherein the ring is snap-fit connected to the bridgepiece.

14. A castor according to claim 1, wherein the tubular portions are snap-fitted together, there being inter-engaging snap-fit formations formed respectively on each of a pair of cooperating surfaces of said tubular portions by which the plain bearing support for said other tubular portion is provided by said one tubular portion.

15. A castor according to claim 1, wherein the bearing which supports said one tubular portion for rotation on the axle comprises a roller bearing.

16. A castor according to claim 15, wherein the roller bearing is free to float axially between the limbs.

17. A castor according to claim 15, wherein the roller bearing is encased between radially inward projections formed respectively at the remote ends of the central aperture of each of the tubular portions.

18. A castor according to claim 1, wherein the axle comprises a nut and a bolt, and a tube surrounds a shank of the bolt and extends between the limbs, the nut and bolt being tightened up to clamp the limbs against the ends of the tube and the nut and bolt limiting outward deflection of the limbs.

19. A castor according to claim 18, wherein the bearing which supports said one tubular portion for rotation on the axle comprises a roller bearing which is fitted on the outer surface of the tube.

20. A castor according to claim 1, wherein each rotatable disc is formed by moulding and the outer rim of each annular disc portion is formed of a wear resistant material which is mechanically interlocked with the remainder of the annular disc portion.

* * * * *